United States Patent Office.

JOHN D. LOVE, OF HARRISBURG, OREGON.

Letters Patent No. 108,371, dated October 18, 1870.

IMPROVEMENT IN MEDICAL COMPOUNDS OR LINIMENTS.

The Schedule referred to in these Letters Patent and making part of the same.

*To all whom it may concern:*

Be it known that I, JOHN D. LOVE, of Harrisburg, in the county of Linn and State of Oregon, have invented a new and useful Improvement in Medical Compound; and I do hereby declare that the following is a full, clear, and exact description thereof, which will enable others skilled in the art to make and use the same.

The object of this invention is to provide a remedy for rheumatism and all kindred diseases; and It consists in the compound hereinafter described.

In carrying out my invention and discovery, I make use of the following ingredients, in about the proportions named, viz:

Cayenne pepper, two ounces; opium, one-fourth ounce; gum guac., one ounce; alcohol, one quart.

Mix the above ingredients together, in a glass vessel, and allow it to stand for ten days. Then take of oil of hemlock, one ounce; oil of balsam fir, one ounce; oil of cedar, one ounce; oil of sassafras, one ounce; spirits turpentine, two ounces; alcohol, one quart. Let this stand (after mixing together in a glass vessel) ten days.

Then take one-half gallon of soft water, in which dissolve one pound of Castile soap. Heat the water to nearly the boiling-point; then pour the two above-described mixtures into a stone vessel; then add the water, with the soap dissolved therein. The compound thus formed is then filtered into a glass jar, and is ready for use.

This forms a liniment which is most efficacious in the case of rheumatism, spinal and kidney diseases, and all kindred affections of the human body.

For the cure of bruises and contusions, in both man and beast, it is invaluable.

Having thus described my invention,

I claim as new and desire to secure by Letters Patent—

The above-described medical compound or liniment, substantially as and for the purposes set forth.

JOHN D. LOVE.

Witnesses:
JOHN J. BABER,
BENJ. H. ROACH.